(12) United States Patent
Yxfeldt

(10) Patent No.: US 10,618,835 B2
(45) Date of Patent: Apr. 14, 2020

(54) GLAZING UNIT

(71) Applicant: Carl-Johan Yxfeldt, Stockholm (SE)

(72) Inventor: Leif Yxfeldt, Stockholm (SE)

( * ) Notice: Subject to any disclaimer, the term of this patent is extended or adjusted under 35 U.S.C. 154(b) by 72 days.

(21) Appl. No.: 15/560,590

(22) PCT Filed: Mar. 23, 2016

(86) PCT No.: PCT/SE2016/050238
§ 371 (c)(1),
(2) Date: Sep. 22, 2017

(87) PCT Pub. No.: WO2016/153418
PCT Pub. Date: Sep. 29, 2016

(65) Prior Publication Data
US 2018/0086665 A1    Mar. 29, 2018

(30) Foreign Application Priority Data

Mar. 24, 2015  (SE) .................................. 1550346

(51) Int. Cl.
*E06B 3/67*       (2006.01)
*C03C 17/245*    (2006.01)
(Continued)

(52) U.S. Cl.
CPC ............ *C03C 17/245* (2013.01); *C03C 17/23* (2013.01); *E06B 3/6715* (2013.01); *E06B 9/24* (2013.01);
(Continued)

(58) Field of Classification Search
CPC ... E06B 3/6715; E06B 3/66366; Y02B 80/22; C03C 17/245; C03C 2218/154
See application file for complete search history.

(56) References Cited

U.S. PATENT DOCUMENTS

| 4,081,934 A | * | 4/1978 | Franz .................. E06B 3/66366 |
| | | | 428/333 |
| 4,206,615 A | | 6/1980 | Sobajima et al. |
| | | | (Continued) |

FOREIGN PATENT DOCUMENTS

| WO | 02/062716 A1 | 8/2002 |
| WO | 2012/110782 A1 | 8/2012 |
| | (Continued) | |

OTHER PUBLICATIONS

International Search Report, dated Jun. 21, 2016, from corresponding PCT application No. PCT/SE2016/050238.
(Continued)

*Primary Examiner* — Donald J Loney
(74) *Attorney, Agent, or Firm* — Young & Thompson

(57) ABSTRACT

Disclosed is a glazing unit including an insulating glazing unit that is assembled with at least three panes for use in a window or as a part of a wall in a property, including a first pane that is located closer to the exterior of the property, a second pane located closer to the interior of the property, and a third pane located between the first and the second panes, whereby the first pane is provided on its surface that is facing inwards with a coating that reduces the radiation of heat in the form of an oxide layer burned into the surface of the pane, whereby also the second pane and the third pane are provided with a coating that reduces the radiation of heat in the form of an oxide layer that is burned into the surface of the pane.

20 Claims, 1 Drawing Sheet

(51) Int. Cl.
*C03C 17/23* (2006.01)
*E06B 9/24* (2006.01)
E06B 3/663 (2006.01)
E06B 3/677 (2006.01)

(52) U.S. Cl.
CPC .... *C03C 2217/21* (2013.01); *C03C 2218/154* (2013.01); *E06B 3/66366* (2013.01); *E06B 3/677* (2013.01); *E06B 2009/2417* (2013.01); *Y02B 80/22* (2013.01)

(56) References Cited

U.S. PATENT DOCUMENTS

| | | |
|---|---|---|
| 5,229,881 A | 7/1993 | Day et al. |
| 2005/0138892 A1* | 6/2005 | Misonou .................. E06B 3/66 52/782.1 |
| 2007/0081228 A1 | 4/2007 | Hartig |
| 2010/0206290 A1 | 8/2010 | Thomsen et al. |
| 2011/0262694 A1 | 10/2011 | Janssen et al. |
| 2012/0090246 A1 | 4/2012 | Nunez-Regueiro et al. |
| 2013/0149473 A1 | 6/2013 | Frank et al. |
| 2014/0154434 A1 | 6/2014 | Nunez-Regueiro et al. |
| 2014/0237917 A1 | 8/2014 | Theios et al. |
| 2015/0275567 A1* | 10/2015 | Jun .......................... E06B 3/66 428/34 |

FOREIGN PATENT DOCUMENTS

| | | |
|---|---|---|
| WO | 2013/173680 A1 | 11/2013 |
| WO | 2014/073794 A1 | 5/2014 |

OTHER PUBLICATIONS

Office Action for Chinese Patent Application No. 2016800301881 dated May 31, 2019 with English translation provided.

\* cited by examiner

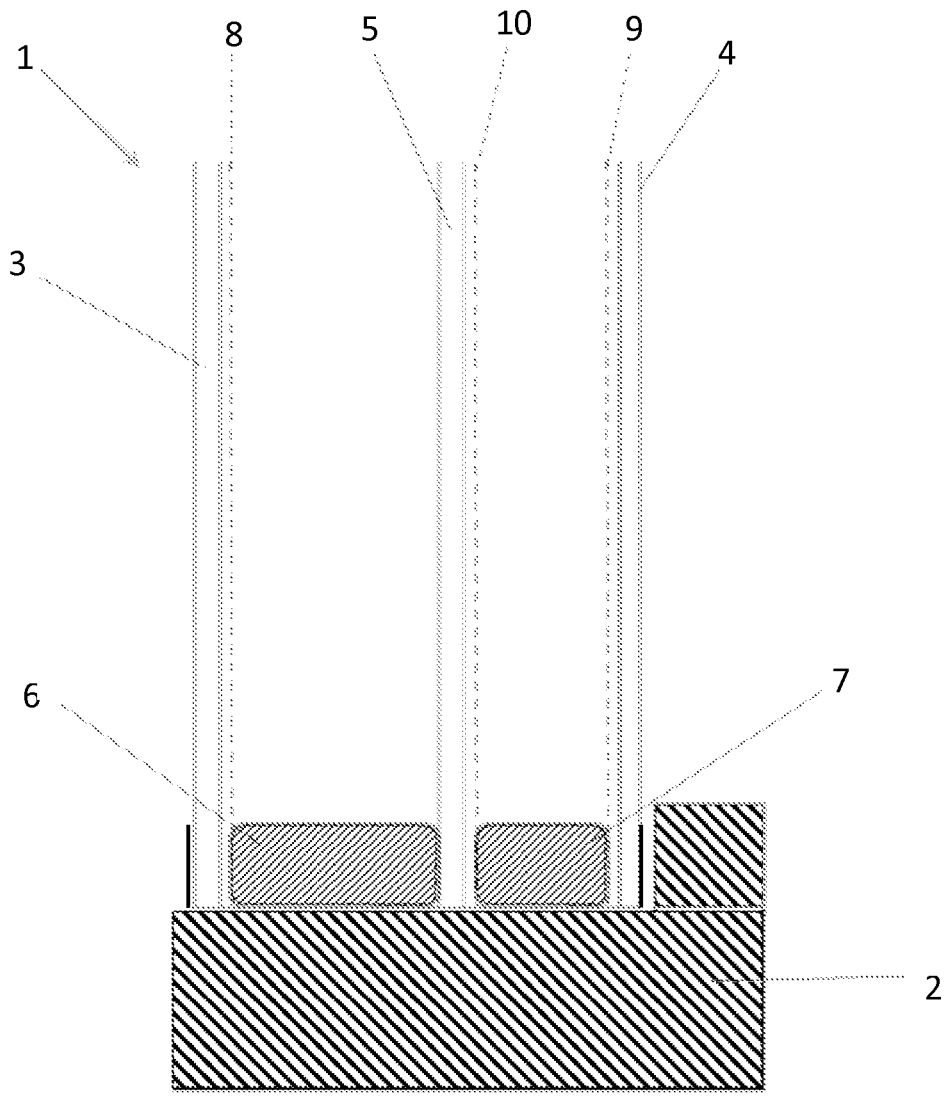

GLAZING UNIT

BACKGROUND OF THE INVENTION

Field of the Invention

The present invention relates to a glazing unit, and to be more precise an insulating glazing unit assembled from at least three panes to be used in a window in an outer wall or as an outer wall itself, in a property.

Description of the Related Art

In countries with temperatures that vary throughout the year, and in particular in countries where there is a need for considerable heating during the winter, the primary consideration when designing glazing units has been to be able to design these such that they do not release too much heat, i.e. when the internal compartment has been heated, it is desired that the heat is not to disappear out through the windows. The focus, therefore, has principally been that the panes are primarily to insulate against heat loss, i.e. they are to reduce the emission of heat.

As glazing units have become larger, and in many cases also constitute a greater part of the outer walls, an ever-greater amount of sunshine has been absorbed by the property, which during the warm part of the year creates a need for cooling, and air conditioning units are thus installed for this. As glazing units have become ever larger, and in addition in office settings in which many people and machines that create heat are present, the need for cooling in this way increases during the warm part of the year, and many air conditioning units that have been installed are not dimensioned to be able to cope with temperatures that are above a certain limit. The requirement is often posed today that the indoor temperature is not to exceed 21° C.

In order to reduce the absorption of heat by radiation, many attempts have been made to apply a coating on the inner surface of the innermost pane, possibly in the form of a sunlight-protection film applied to the inner surface of the pane. This reduces to a certain degree the absorbed radiative heat of the sun, but is reduces principally the light absorbed. The disadvantage of such a sunlight-protection film is, however, that it reduces at the same time the possibility of seeing out to the same degree. Further, it is not possible to mount such an applied sunlight-protection film onto the internal surfaces of the panes of a hermetically sealed glazing unit, an insulating glazing unit, since the heat between the panes in such a unit accelerates the breakdown of such a film and/or causes it to become detached from the pane.

Also panes that are coated during manufacture with an oxide layer on one side of the pane in order to reduce the absorption of sunshine by radiation have been developed. Such an oxide layer may be also coloured in order to give the pane a certain hue when it is seen from a distance, which may be an effect that it is desired to achieve for properties for which the complete facade principally consists of glass. Such an oxide layer is arranged on one side of the pane, and in this case normally on the internal side of the outermost pane of glazing units that are assembled from several glass panes.

In order to increase the insulating ability of the glazing units, with respect to not only the emission of heat by radiation but also the absorption of heat by radiation, insulating panes are now normally used, with two or three panes of glass that are joined in a gastight metal frame with a gas, normally a noble gas, introduced into the compartment between the different panes of glass. For such assembled insulating glazing units, a pane with an oxide coating arranged on the side that faces inwards into the property has been selected for the pane that is facing outwards from the property. The other panes in the glazing unit generally do not have a coating.

While it is true that trials have been carried out applying an oxide layer also onto a second pane, no advantages of this have been observed. The cost for a pane with an oxide layer is higher, and it is a general opinion that several oxide layers would not give any noticeable better values with respect to the emission of heat by radiation or the absorption of heat by radiation. The effects that have been seen in such trials include that the pane has removed so much light that they have been experienced as unattractive. It is possible that the choice has been made to instead increase the thickness of the oxide layer that is applied to the inner surface of the outermost pane. It has thus been possible to choose an innermost pane of a cheaper glass, completely without coating.

BRIEF SUMMARY OF THE INVENTION

The purpose of the present invention, therefore, is to achieve a new glazing unit that is designed to further reduce the absorption of solar heat by radiation through the glazing unit, without intruding to any noteworthy degree on its transparency to light. It is to be remembered that it is desired that daylight enter, and that it is possible to see out in an unimpeded manner.

The purpose of the invention is achieved through, in an insulating glazing unit that is assembled from at least three panes in which the outwardly facing pane is provided on its inner surface with an oxide layer that has been burnt into the surface of the pane, also the inwardly facing pane and an intermediate pane being provided with an oxide layer that has been burnt into the surface of the pane.

According to one preferred embodiment of the invention, the coatings consist of oxide layers that have been formed in association with the manufacture of the panes.

According to a further preferred embodiment of the invention, the glazing unit is designed as an insulating glazing unit with three or four panes.

According to a further preferred embodiment of the invention, the oxide layer on the outwardly facing pane is of the same material as the oxide layer on the inwardly facing pane.

According to a further preferred embodiment of the invention, the inwardly facing pane is provided with the oxide layer on its outwardly facing side.

According to a further preferred embodiment of the invention, an intermediate pane is provided with the oxide layer on its inwardly facing side.

BRIEF DESCRIPTION OF THE DRAWINGS

The invention will now be described in more detail in the form of a non-limiting embodiment given as an example, illustrated in the attached drawing where FIG. 1 shows an embodiment of a glazing unit according to the invention with an oxide layer on the inner surface of the outwardly facing pane and on the outwardly facing surface of the inwardly facing pane, as also on the inwardly facing surface of the intermediate pane in an insulating glazing unit with three panes.

FIG. 1 shows a glazing unit 1 according to the invention inserted into a window frame 2. In this example the glazing unit 1 is an insulating glazing unit comprising a first pane 3 facing towards the exterior of the property in which it is mounted, a second pane 4 that faces towards the interior of the property in which it is mounted, and a third pane 5 located between the first pane 3 and the second pane 4.

DETAILED DESCRIPTION OF THE PREFFERRED EMBODIMENTS

The three panes 3, 4, 5 are joined in a known manner, by, for example a glue and a gastight metal frame 6, 7 between the panes, and where the three panes are separated by a compartment filled with gas. It is preferable that the gas be a noble gas, such as, for example, argon, which is commonly used in such a context.

The first or outermost pane 3 is provided on its inner surface in known manner with a coating 8, to be more precise a coating in the form of an oxide layer that reduces the radiation of heat. This coating 8 has been burned into the surface of the pane and has preferably been created on the inner surface of the pane in association with its manufacture, by, for example, sputtering. It is preferable that the oxide coating be a metal oxide coating.

In the embodiment that is shown, also the second or innermost pane 4 is provided with a coating 9, of the same type as the coating 8 on the first pane 3. The coating 9 on the inner pane 4 is, in contrast, facing outwards, i.e. away from the interior of the property and towards the coating 8 on the first pane 3. In the same way, also the third or intermediate pane 5 is provided with a coating 10, preferably of the same type as the coatings 8 and 9 on the outermost and innermost panes 3 and 4. It is preferable that the oxide layer 10 on the intermediate pane 5 be arranged on its inner surface, i.e. towards the internal pane 4 and its coating 9, but it is conceivable also that it may be arranged on the opposite side of the pane 5. It is appropriate that also the coating 10 is of the same material as the coatings 8 and 9, and in the same way manufactured in association with the manufacture of the pane itself.

It is possible to produce also glazing units according to the invention with more than three panes in the glazing units, in order to, among other effects, further increase the heat insulation ability, i.e. to further reduce what is known as the "U value". In such a case, a further pane should be arranged as a further intermediate pane, such that the outermost pane with its coating on the inner surface is in this way retained, as is also the innermost pane with its coating on the outwardly facing side. It is, however, appropriate that the further intermediate pane should be without a coating in order not to reduce the admission of light.

It has been possible to achieve with glazing units according to the invention very good results with respect to the admission of radiative heat without a negative influence on the damping of the emission of heat by radiation or the transmission of light, and it has in this way been possible to reduce the absorption of heat by radiation such that the requirements for the cooling of indoor air with the aid of air conditioning units can be reduced.

In order to be used as panes in offices or domestic buildings, it has been determined that the transmission of light should be, in order to be acceptable, at least approximately 40%, in order to prevent the space indoors being experienced as too dark. For prior art glazing units, therefore, it has been decided to allow the minimum value of this parameter to be approximately 45% transmission of light. With respect to the blocking of the absorption of radiative solar energy, it has been possible up until now to achieve a best value of approximately 80%, which may, despite everything, give far too high a heating of the interior air, and which must then be removed by cooling. With glazing units according to the present invention, it has been possible to achieve a remarkable blocking of the absorption of radiative solar energy of approximately 90%, with the retention of a fully acceptable level of the transmission of light of approximately 46%. The absorption of radiative solar energy is thus halved with a glazing unit according to the invention compared with the best prior art glazing units, and this is achieved without impairing the admission of light.

With a glazing unit according to the invention, therefore, the heating of the interior air is significantly reduced, which means that the requirement for cooling is significantly reduced. Since the cost of cooling air is approximately fives times greater than the cost of warming air, the savings can be large. It has been calculated also that the cost of exchanging existing windows or glazing units is lower than the cost would be to increase the capacity of existing air conditioning units in order to achieve corresponding indoor temperatures.

It has been noted also that it seems to be easier to see through glazing units according to the invention from the exterior, which means that the panes do not give such a sterile impression from the outside as many other glazing units, since it is possible to see that someone is moving around inside the building. The glazing units have a clearly lower mirror effect than prior art glazing units. The glazing units according to the invention have been experienced also as having better sound damping properties than other insulating glazing units with three panes.

It has been stated in the description above that the oxide coatings that are mounted on the panes are of the same type, but it is obvious that they may be also of different types, in particular in the case in which one of them provides a hue either naturally or by design.

It is obvious that the invention can be applied also for insulating glazing units with more than three panes, where it is appropriate that the intermediate panes, apart from the innermost of them, be panes without an oxide layer, in order not to further reduce the transparency to light.

The invention claimed is:

1. A glazing unit comprising:
an insulating glazing unit that is assembled with at least three panes for use in a window or as a part of a wall in a property, the insulating glazing unit comprising
a first pane that is located closer to the exterior of the property,
a second pane located closer to the interior of the property, and
a third pane located between the first and the second panes,
wherein the first pane is provided on its surface that is facing inwards with a coating that reduces the radiation of heat in the form of a first oxide layer burned into the surface of the pane by sputtering, and
the second pane and the third pane are provided with a coating that reduces the radiation of heat in the form of a second oxide layer that is burned into the surface of the pane by sputtering.

2. The glazing unit according to claim 1, wherein the coating that reduces the radiation of heat of the second pane is arranged on the outwardly facing side of the second pane.

3. The glazing unit according to claim 1, wherein the coating of the third pane faces inwards toward the interior of the property.

4. The glazing unit according to claim 1, wherein the oxide layer is a metal oxide layer.

5. The glazing unit according to claim 1, wherein the oxide layer is of the same material on all panes in the glazing unit.

6. The glazing unit according to claim 1, wherein the outermost pane has an oxide layer of a material other than the material on the panes that are located inside of the outermost pane.

7. The glazing unit according to claim 1, wherein a fourth pane is arranged between the first and the second pane, the fourth pane being formed without an oxide layer.

8. The glazing unit according to claim 2, wherein the coating of the third pane faces inwards toward the interior of the property.

9. The glazing unit according to claim 2, wherein the oxide layer is a metal oxide layer.

10. The glazing unit according to claim 3, wherein the oxide layer is a metal oxide layer.

11. The glazing unit according to claim 2, wherein the oxide layer is of the same material on all of the panes in the glazing unit.

12. The glazing unit according to claim 3, wherein the oxide layer is of the same material on all of the panes in the glazing unit.

13. The glazing unit according to claim 4, wherein the oxide layer is of the same material on all of the panes in the glazing unit.

14. The glazing unit according to claim 2, wherein the outermost pane has an oxide layer of a material other than the material on the panes that are located inside of the outermost pane.

15. The glazing unit according to claim 3, wherein the outermost pane has an oxide layer of a material other than the material on the panes that are located inside of the outermost pane.

16. The glazing unit according to claim 4, wherein the outermost pane has an oxide layer of a material other than the material on the panes that are located inside of the outermost pane.

17. The glazing unit according to claim 2, wherein a fourth pane is arranged between the first and the second pane, which the fourth pane being formed without an oxide layer.

18. The glazing unit according to claim 3, wherein a fourth pane is arranged between the first and the second pane, the fourth pane being formed without an oxide layer.

19. The glazing unit according to claim 4, wherein a fourth pane is arranged between the first and the second pane, the fourth pane being formed without an oxide layer.

20. The glazing unit according to claim 6, wherein a fourth pane is arranged between the first and the second pane, the fourth pane being formed without an oxide layer.

* * * * *